Dec. 18, 1956  D. N. GOLDBERG  2,774,455
CLUTCH OR BRAKE BAND
Filed June 16, 1953

INVENTOR
David N. Goldberg.
BY
Gustave Miller
ATTORNEY

:::
United States Patent Office 2,774,455
Patented Dec. 18, 1956

2,774,455
CLUTCH OR BRAKE BAND

David N. Goldberg, Wheeling, W. Va.

Application June 16, 1953, Serial No. 361,933

6 Claims. (Cl. 192—107)

This invention appertains to improvements in clutch or brake bands and the term "band" is used in its generic sense to apply to bands for a clutch or a brake.

This invention particularly relates to bands of the type which are made in one or more sections, which are curved in shape, and when in more than one piece have their adjoining ends connected together by an adjustable joint. The sections are commonly moved radially of a drum by a band operating mechanism that tightens the sections on the drum and a spring that releases the sections from frictional engagement of the drum.

The primary object of this invention is to provide a method of and a novel means for joining the ends of the band sections so that the sections can move relative to each other about an axis radially of a drum. Such a joint will permit the sections to freely align themselves so that the sections remain in circumferential alignment upon a misdirection of applied pull to tighten the sections on the drum. Thus, the joined ends of the sections can swivel relative to each other permitting curvilinear movement of a section along the longitudinal axis of the drum while remaining in the same circular arc with its companion section.

A further object of this invention is to provide a method applying a vibration damper aligning swivel joint to an existing brake or clutch band as well to a band being initially manufactured.

A further object of this invention is to provide a vibration damper aligning swivel joint that may be applied to both of so-called one-piece and two-piece brake or clutch bands, particularly of the large size normally used in earth working and oil well drilling machinery as well as hoisting or other types of machinery, including vehicular equipment.

A further object of this invention is to provide a connecting means for such sections that will also, while retaining the sections against endwise movement, permit bodily movement of each section relative to another radially of a drum and independent of or simultaneous with the swivel movement of the sections.

Another object of this invention is to provide means for joining the ends of the sections in a manner to decrease and in most instances eliminate breakage anywhere in the band commonly occurring in all conventional bands due to vibration and torque set up by the tightening and releasing assembly.

A still further object of this invention is to provide a simple and sturdy vibration damping swivel joint for the ends of band sections, which joint will permit the construction of bands in smaller sections for ease in installation and which joint can be installed on bands now in use by dividing them into sections and adding this joint.

These and ancillary objects and structural features of merit are attained by this invention, the preferred embodiment of which is set forth in the following description and illustrated in the accompanying drawing, wherein.

Figure 1:
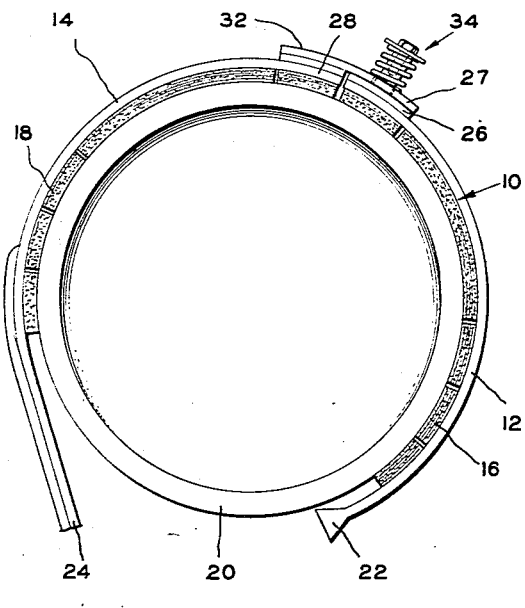
Fig. 1 is a side view of a one-piece band in place upon a drum and showing the adjoining ends of the sections secured together by a joint in accordance with the invention.

In the drawing, the band 10 of Fig. 1, normally made in one piece has been divided or split into two sections 12 and 14 and is commonly referred to as a one piece band. The two sections 12 and 14 have their inner faces conventionally provided with linings 16 and 18 that frictionally engage the surface of the drum 20 around which the sections are companionly circumposed. The ends 22 and 24 of the sections are spaced apart and are formed for attachment to any regular tightening and releasing assembly (not shown).

The adjoining ends 26 and 28 of the two sections are formed for cooperative interengagement and, thus, the end portion 26 has been thickened as by welding a shim 27 thereto. The body of the section 12 is of the same thickness as the body of the section 14. The end portion 26 has an outer arcuate face 30. The end portion 28 of body section 14 is also of greater thickness than the center portion of section 14, and on this thick end portion 28 is welded an arcuate cover plate 32 that overlaps the arcuate surface 30 of integrally secured shim 27 on end 26 radially of the drum 20. The cover plate 32 is formed on the same radius as the end 26 and is, therefore, complemental in curvature to the surface 20 on which it bears. This arrangement provides an overlapping end construction which is held together by the connecting means 34.

Figure 2:
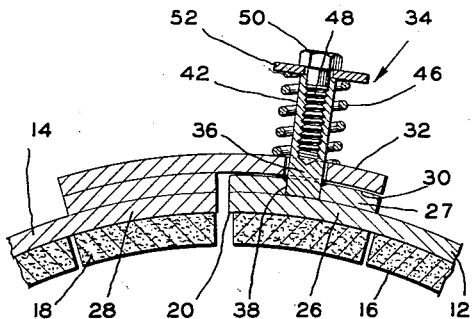
Fig. 2 is an enlarged vertical sectional view of the joint.
Figure 4:
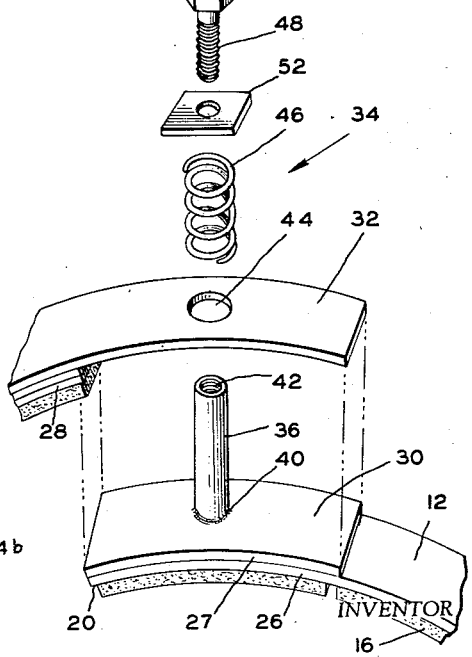
Fig. 4 is an exploded perspective view of this joint in disassembled form.

The connecting means 34, as shown in detail in Figs. 2 and 4, includes a stud pin 36 which is pressed into a radial opening 38 through the surface 30 and is welded, as at 40, to the end portion 26 of section 12 so that it projects radially therefrom. The stud pin 36 is tapped so as to provide a threaded bore 42 that extends through the outer end thereof. An opening 44 of the same size as stud pin 36 is formed through the tongue 32 to receive the plug.

A coiled compression spring 46 is placed around the stud pin 36 and bears at its inner end on the outer surface of the cover plate 32. Completing the connection between the ends 26 and 28 is a stud bolt 48 which has its shank threaded into the bore 42. Secured by the bolt 48 between its head 50 and the outer end of the stud pin 36 is a washer or shim plate 52. The shim plate 52 also provides an increased bearing surface for the spring 46, the outer end of which bears against the underside of the plate.

Thus, the complete joint consists of only a small number of parts that may be added to existing bands or may be initially built in the band and the simplicity thereof will be apparent to those skilled in the art from a consideration of the drawing.

In use, the end portions 26 and 28 can swivel relative to each other due to the stud pin and the opening 44 so that the sections can pivot about an axis radial of the drum 20 while remaining in the same plane curve or circular arc. This movement of the sections imparts flexibility to the band and the connecting means allows the band to align itself to the drum 10 despite misdirection of applied pull to tighten or release the band. The body section 14 at its end 28 can swivel about the stud pin 36 while the section 12 at its end 26 can likewise swivel. Thus, the ends are connected in a manner to prevent endwise movement thereof relative to each other in an arc around the drum but are free to swivel. Additionally, the end 28 can move radially of the drum on the stud independent of the section 12 while the stud 36 is free to move axially in the opening 44. Such relative movement, occurring during application of the band in clutching or braking the drum 20 is opposed by the compression spring 46 which dampens the vibration or torque and yet allows the sections to be self-aligning. The spring 46 tends to retain the sections in the same circular arc as they swivel relative to each other but a compound swivel and radial relative movement of the sections with respect to the drum can be effected. The band is, thus, self-aligning and semi-flexible.

Figure 3:
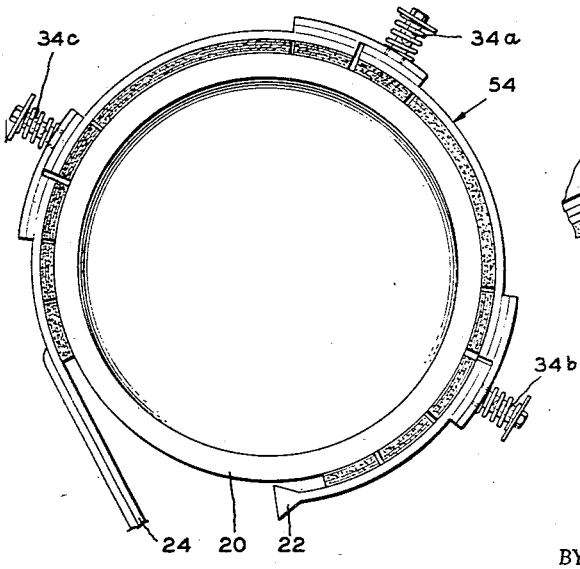
Fig. 3 is a side view of a band provided with three of these joints in place upon a drum.

In Fig. 3, connecting means 34a, 34b and 34c identical to the connecting means 34, are used to connect the four sections of the band 54 together.

The bands 10 and 54 are of the type primarily used on earth moving equipment such as dragline and shovel brake and clutch friction bands, but, obviously, the connecting means 34 could be used with any type of band, whether of the external contracting type, or of the internal expanding type, so that while the preferred embodiment and environment of this invention have been illustrated and described herein, the invention encompasses other structural forms and environments, as come within the purview of the appended claims.

Having thus set forth and disclosed the nature of this invention, what is claimed is:

1. In a clutch or brake band, semi-circular band sections having overlapping ends, means interconnecting said ends for relative pivotal movement about a radial axis, said interconnecting means including means permitting limited bodily relative radial movement between the ends of the sections.

2. In a clutch or brake band, semi-circular band sections, means interconnecting the adjacent ends of said sections for relative swivel movement about a radial axis and for bodily relative radial movement, and spring means carried by the connecting means opposing the relative radial movement of the sections.

3. In a clutch or brake band, semi-circular band sections having adjoining ends disposed in overlapping inner and outer relation, a stud radially projecting from the inner end, the outer overlapping end having an opening to rotatably and slidably receive said stud, means secured to the stud to mount it in the opening and permit limited axial movement of the stud relative to said opening, and means carried by the stud yieldably urging said outer overlapping end toward said inner end.

4. In a clutch or brake band as recited in claim 3, wherein said last named means includes a coil spring surrounding said stud and said stud is provided with a bearing surface at its outer end to compress said spring between such surface and said outer overlapping end.

5. A vibration dampening self-aligning swivel joint for interconnecting separate arcuate sections of brake or clutch bands comprising, an arcuate cover plate rigidly secured to one end of a first arcuate section and overlapping the adjacent end of a second arcuate section, said cover plate having an aperture formed therein, a stud pin secured to said adjacent end of said second arcuate section and extending radially therefrom through said aperture in said cover plate, said stud pin having shoulder means on the outer end thereof, and a coil spring positioned on said stud pin compressed between said cover plate and said shoulder means on the outer end of said stud pin.

6. A vibration dampening self-aligning swivel joint as recited in claim 5 wherein said shoulder means comprises a stud bolt tapped into the outer end of said stud pin and a washer positioned between the head of said stud bolt and said coil spring.

References Cited in the file of this patent

UNITED STATES PATENTS

| 1,529,087 | Reynolds | Mar. 10, 1925 |
| 1,590,395 | Smith | June 29, 1926 |
| 1,736,985 | Sovereign | Nov. 26, 1929 |
| 2,708,010 | Wolf | May 10, 1955 |

FOREIGN PATENTS

| 269,850 | Great Britain | Oct. 27, 1927 |